United States Patent
White et al.

(10) Patent No.: US 6,614,652 B2
(45) Date of Patent: *Sep. 2, 2003

(54) APPARATUS AND METHOD FOR SELECTABLY INCLUDING A MASS STORAGE DEVICE IN A SELECTABLE SPACE OF A COMPUTER SYSTEM

(75) Inventors: Michael S. White, San Jose, CA (US); Clifford B. Willis, Tracy, CA (US); Victor E. Jochiong, Mill Valley, CA (US); Vincent P. Hileman, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/202,598

(22) Filed: Jul. 24, 2002

(65) Prior Publication Data
US 2002/0181198 A1 Dec. 5, 2002

Related U.S. Application Data

(63) Continuation of application No. 09/654,798, filed on Sep. 5, 2000, now Pat. No. 6,490,152.
(60) Provisional application No. 60/179,594, filed on Feb. 1, 2000.

(51) Int. Cl.[7] .................................................. G06F 1/16
(52) U.S. Cl. ...................... 361/684; 361/816; 364/708.1
(58) Field of Search ............................... 361/684, 687, 361/683, 685, 686, 724–727, 733, 752, 816, 818, 825; 364/708.1; 370/364; 439/74, 76.1

(56) References Cited

U.S. PATENT DOCUMENTS

| | | | | |
|---|---|---|---|---|
| 6,185,093 B1 | * | 2/2001 | Moss | 361/684 |
| 6,418,026 B1 | * | 7/2002 | Ho et al. | 361/727 |
| 6,452,809 B1 | * | 9/2002 | Jackson et al. | 361/796 |
| 6,490,152 B1 | * | 12/2002 | White et al. | 361/684 |
| 2001/0036178 A1 | * | 11/2001 | Savory | 370/364 |

* cited by examiner

Primary Examiner—Darren Schuberg
Assistant Examiner—Hung Van Duong

(57) ABSTRACT

An apparatus and method for selectably including a mass storage device in an expansion card space of a computer system, particularly an expansion card area lacking a space dedicated solely for the mass storage device. An apparatus according to the invention includes a mass storage frame, and an interface board to couple the mass storage device to an expansion card slot on backplane in the computer system. A computer system includes the apparatus. Another computer system includes a removable support frame for supporting a mass storage device, the removal of which allows a larger expansion card or an additional expansion card to be inserted into the backplane.

10 Claims, 11 Drawing Sheets

APPARATUS AND METHOD FOR SELECTABLY INCLUDING A MASS STORAGE DEVICE IN A SELECTABLE SPACE OF A COMPUTER SYSTEM

PRIORITY CLAIM

This application is a continuation of U.S. patent application Ser. No. 09/654,798 (filed Sept. 5, 2000), which issued on Dec. 3, 2002 as U.S. Pat. No. 6,490,152 and which claims the benefit of U.S. Provisional Application No. 60/179,594 (filed Feb. 1, 2000).

FIELD

The invention relates generally to computer systems with FRU's (field replaceable units), and the ability to selectively use a slot for a removable media device such as a hard disk drive.

BACKGROUND

Distributed computing systems (or computer networks) are generally known. Computer networks typically comprise a plurality of personal computers, or workstations, or network appliances and other data processing devices connected together for information exchange. At the heart of the computer network is one or more network servers, hereafter generally referred to as "servers." In most computer networks, network servers are responsible for managing the network, running applications, and administering documents or data generated at the attached data processing devices.

Due to the fact that network servers manage and/or store data generated, the network server typically has mass storage capabilities. The mass storage capabilities may be implemented by a disk subsystem or disk array where one or more disk drives are combined. SCSI is one example of an interface standard that permits multiple hard disk drives to be daisy chained to a single interface connector.

Network interface controller (NIC) cards commonly are used to couple the server to one or more computer networks. Both the SCSI hard disk and network interface controller connect to slots or connectors in the network server system board in a space designed and designated to accommodate their size and operational requirements. A server system board includes connectors for receiving external cards, such as the NIC cards. Other expansion slots may be provided on the server system board such as Peripheral Component Interconnect (PCI) and Compact PCI expansion slots for receiving peripheral devices designed for those particular bus standards.

One or more network servers are typically found in the data center for Internet Service Providers (ISPs) and Application Service Providers (ASPs). One issue at sites supporting network servers is that space is often at a premium, and the servers are often rack mounted and closely co-located. An additional issue is found in the need for network servers to be scalable, given the disparate size and growth rates of ISPs and ASPs.

As mentioned previously, some rack mounted network servers provide for space to support expansion cards, and adding local mass storage to the chassis, such as a hard disk drive, would be desirable. However, due to size and space constraints network servers may lack a convenient location for a hard disk drive. Real estate is often at a premium at sites supporting server systems, so positioning the hard disk drive outside the chassis may not be viable. Within the server, all available expansion slots may have been assigned for other uses, making it quite difficult to allocate space within the server designated solely for the hard disk drive.

A possible solution is to remove space in an expansion slot within the server which was dedicated to some other peripheral device, and instead assigning the slot to the hard drive. For example, some of the space presently dedicated to expansion cards for insertion into a backplane might be assigned to a hard drive. Correspondingly, the backplane could be redesigned, removing one or more expansion slots for expansion cards and adding a dedicated connector for the hard disk drive. However, this solution is less than ideal. Some customers may prefer the inclusion of a hard disk drive. Other customers may prefer more expansion cards in lieu of the hard disk drive. Trying to accommodate both may result in wasted space in the form of dedicated yet unused expansion slots within the server system.

Therefore, what is needed is a solution which permits the addition of a hard disk drive to a chassis supporting expansion cards. The solution should be flexible, and not force a user into an irreversible choice between a hard disk drive and more expansion cards.

SUMMARY

To overcome the limitations described above, and to overcome other limitations that will become apparent upon reading and understanding the present specification, the present invention discloses an interconnect apparatus for selectively connecting a storage device into a computer server, and a computer server adapted to receive the storage device in an expansion slot. It is one object of the invention to allow a mass storage device to be inserted into an expansion slot within the computer system, for example on a backplane. It is another object of the invention to allow the mass storage device to be located in an area of the computer system chassis that could otherwise be occupied by one or more larger or additional expansion cards in the absence of the mass storage device.

In accordance with these objects, one embodiment comprises a support frame and an interface board. The support frame physically supports a mass storage device such as a hard disk drive within the computer server's chassis. The interface board connects the mass storage device to a connector in the server's chassis. Circuitry on the interface board allows the mass storage device to be connected to the backplane connector. Thus, the mass storage device may then be blind-mated into the server.

In another embodiment, a computer system such as a network server includes a backplane within the computer chassis. The support frame allows a mass storage device to be supported within an area of a computer chassis that can accommodate one or more expansion cards. The backplane may include multiple expansion card slots. A space by the expansion card slots may be occupied by one or more expansion cards and/or the mass storage device.

Another embodiment is a computer system including a backplane, a selectable space, and a support frame. Depending on current requirements, the selectable space can be used for different purposes. The support frame can support a mass storage device in the selectable space. In the absence of the support frame, the selectable space allows a larger or an additional expansion card to be added to the backplane.

DETAILED DESCRIPTION

One or more embodiments are described in a preferred embodiment in the following description with reference to the Figures, in which like numbers represent the same or similar elements. While the description is in terms of the best mode for achieving one or more objectives, it will be appreciated by those skilled in the art that variations may be accomplished in view of those teachings without deviating from the spirit or scope of the described embodiments.

Figure 1:
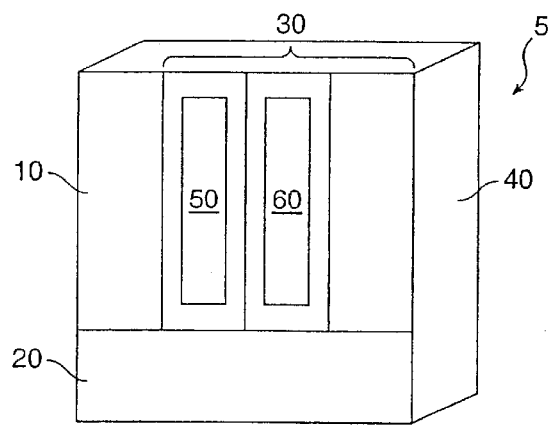
FIG. 1 is a diagram of an exemplary computer system or server.

One example of a computer system in an embodiment is shown in FIG. 1. This embodiment shows a network server 5 including a central processing unit 10, a power supply 20, and an expansion card space 30 within a computer chassis 40. Expansion cards 50 and 60 are shown inserted into expansion slots available within the expansion card area 30. Part of the expansion card space 30 is not occupied by an expansion card, and can accommodate an expansion card in addition to the expansion cards 50 and 60. One example of the network server is the Netra ct1600 by Sun Microsystems, Inc.

Figure 2:
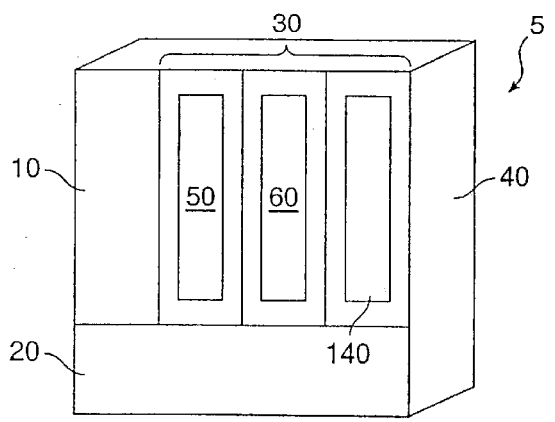
FIG. 2 is a diagram of the computer of FIG. 1 further including a support frame.

FIG. 2 shows an embodiment of a computer system similar to FIG. 1. In FIG. 2, a part of the expansion card space 30 not occupied by an expansion card in FIG. 1 includes a support frame 140. A mass storage device may be installed in the expansion card space 30, supported by the support frame 140. Alternatively, the support frame 140 can be removed from the expansion card space 30, allowing an extra expansion card to be installed in a portion of the expansion card space 30 occupied, partially or wholly, earlier by the support frame 140. Thus, the expansion card space 30 includes a selectable expansion space, which can selectably include either an expansion card or a mass storage device.

Figure 3:
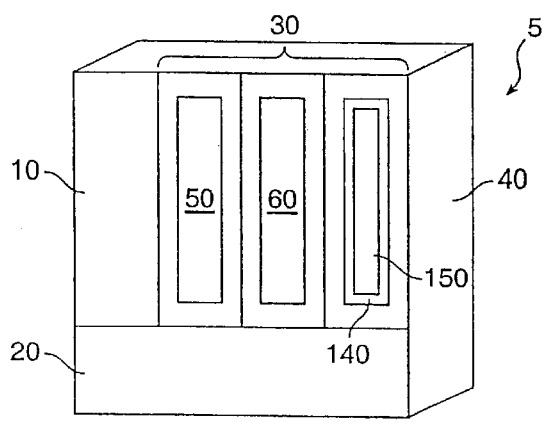
FIG. 3 is a diagram of the computer system of FIG. 2 further including a mass storage device supported by the support frame.

FIG. 3 shows an embodiment of a computer system similar to FIG. 2. The support frame 140 supports a mass storage device 150. The mass storage device 150 can be removed and replaced easily. In one embodiment, the support frame 140 permits blind-mating of the mass storage device 150 in the expansion card space 30, allowing the mass storage device 150 to be replaced quickly.

Figure 4:
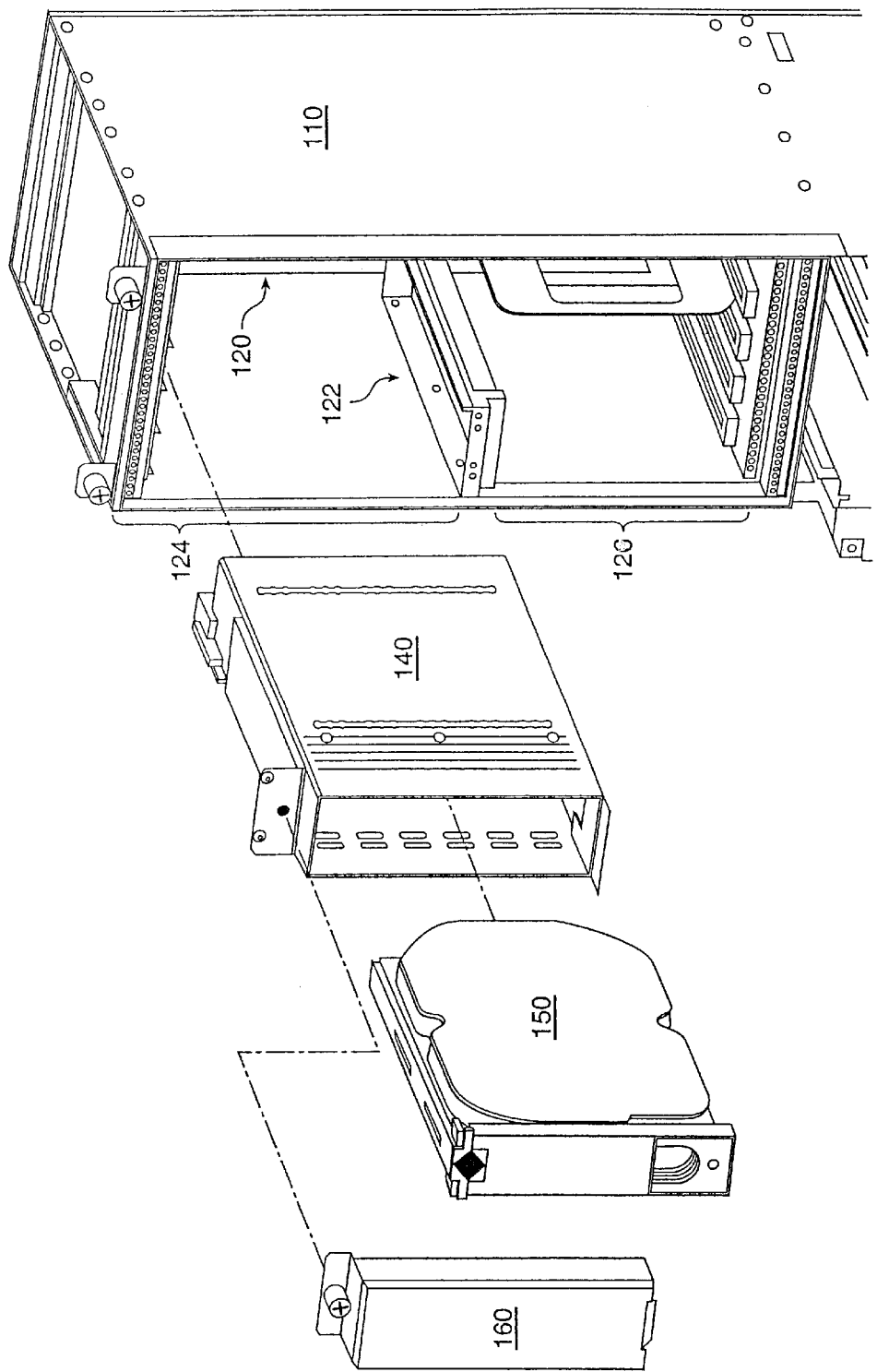
FIG. 4 is an exploded perspective view of a card cage portion of a computer system including the support frame and the mass storage device.

FIG. 4 shows an exploded perspective view of one example of a card cage portion of a network server 5. The card cage portion includes a computer chassis 110, a backplane 120, a mount frame 122, a support frame 140, a mass storage device 150, and a cover 160.

The computer chassis 110 further includes a selectable space 124 and an expansion card space 126. The computer chassis 110 provides structural support for components of the computer system 5, such as boards and wiring. One embodiment of the computer chassis 110 includes a card cage having space dedicated for expansion cards, and a selectable space that can accommodate a mass storage device. Exemplary systems of the invention, such as the Netra ft1800, Netra t1, Netra t1120/1125, or Netra t1400/1405, satisfy standards such as NEBS (Network Equipment Building Standards) and/or ETSI (European Telecommunications Standards Institute).

The selectable space 124 and the expansion card space 126 are positioned by the backplane 120. Expansion cards may be inserted into expansion card slots of the backplane 120. Inserted expansion cards occupy one or both of the adjustable expansion card space 124 and the expansion card space 126. In one embodiment, if the mount frame 122 is removed from the computer chassis 110, the selectable space 124 and the expansion card space 126 become joined, allowing additional or larger expansion cards to be inserted into the backplane 120. The backplane 120 may be passive or active, and may be a midplane. In one embodiment, the backplane 120 conforms to a Compact PCI specification, and the backplane 120 has expansion card slots accepting smaller 3U form factor expansion cards and larger 6U form factor expansion cards. When the support frame 122 is added to the computer chassis 110, the support frame 122 may separate at least a part of the selectable space 124 from the expansion card space 126, preventing one or more larger 6U form factor expansion cards from being inserted into one or more expansion card slots of the backplane 120. The affected expansion card slots of the backplane 120 may be limited to accepting the smaller 3U expansion cards, or even no cards at all. When the mount frame 122 is removed from the computer chassis 110, one or more additional larger 6U form factor expansion cards can be inserted into one or more expansion card slots on the backplane 120.

In another embodiment, a computer system includes a selectable space but no expansion card space, or a selectable space that remains separated from the expansion card space after removal of the mount frame 122.

The support frame 140 supports a mass storage device 150. A cover 160 helps protect the mass storage device 150 from the environment. The support frame 140 is further discussed below in the discussion of FIG. 2. The mass storage device 150 may be any mass storage device for storing data, such as a hard disk drive, an optical drive, or a tape drive.

Figure 5:
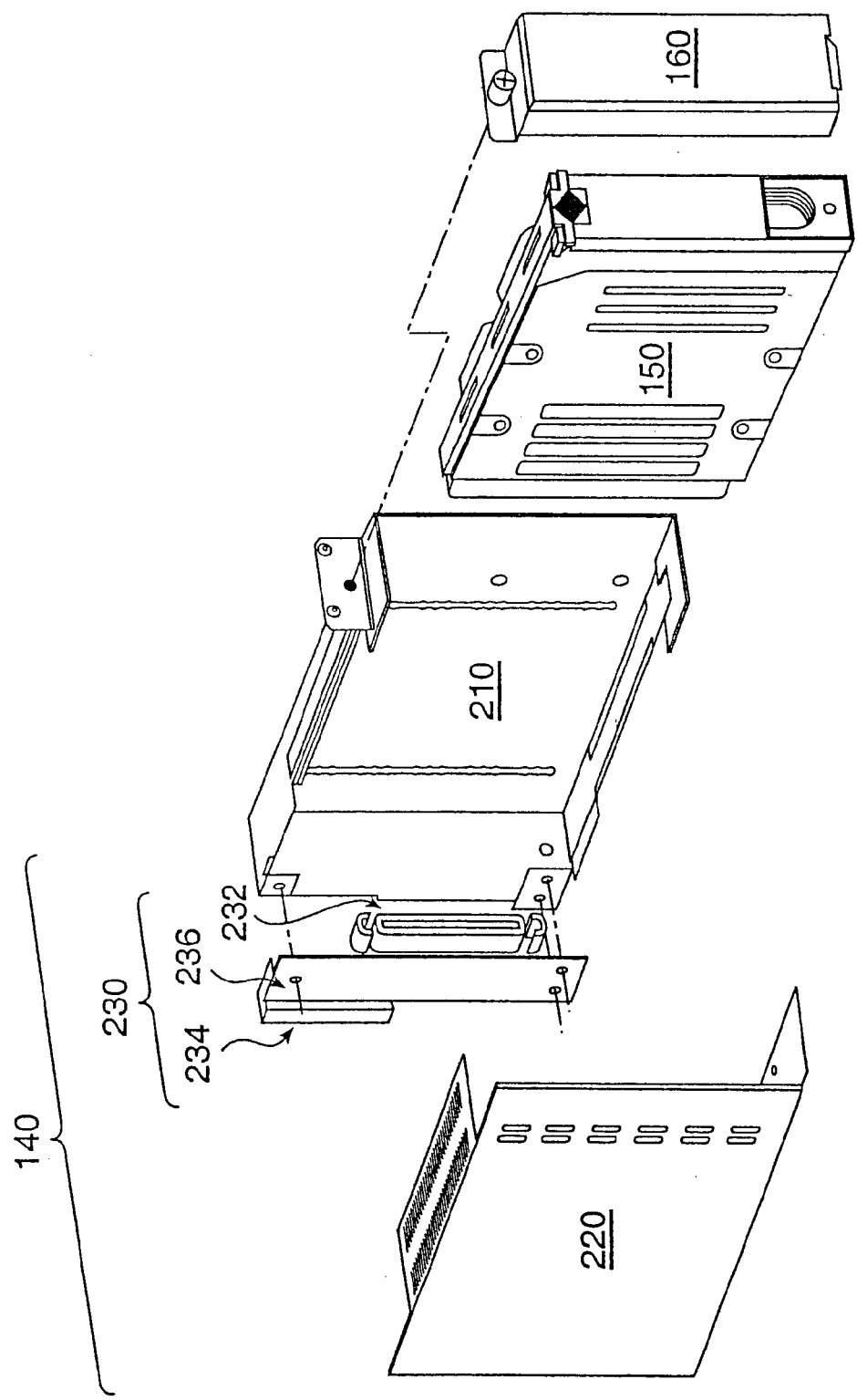
FIG. 5 is an exploded view of the support frame shown in FIG. 4.

FIG. 5 shows an exploded view of the support frame 140 shown in FIG. 4. The support frame 140 has structure for supporting the mass storage device 150 in a location in the computer chassis 110, and allows the mass storage device 150 to survive shock and vibration.

The support frame 140 includes a main frame 210, a cover frame 220, and an interface board 230. In one embodiment, the support frame 140 is detachable from the computer chassis 110 and the mass storage device 150. In other embodiments, the support frame 140 may at least partially be integral to the computer chassis 110, and/or the mass storage device 150. Various embodiments of the support frame 140 partially or substantially wholly enclose the mass storage device 150. Other embodiments of the support frame 140 comprise one primary structural piece. The interface board 230 includes a mass storage connector 232, a backplane connector 234, and circuitry 236 connecting the mass storage connector 232 and the backplane connector 234. The circuitry 236 is further discussed below in the discussion of FIG. 3A, FIG. 3B, and FIG. 3C. In one embodiment, the mass storage connector 232 is an SCA-2 (Single Connector Attachment) connector and the backplane connector 234 is a Compact PCI (Peripheral Component Interconnect) connector. Other types of connectors for plugging into other types of backplanes and mass storage devices are possible. Coupling the mass storage connector 232 with the support frame 140 rather than with the backplane 120 preserves flexibility, because the relevant expansion card slot on the backplane 120 is not permanently dedicated to accepting the mass storage device 150, and can also accept expansion cards. One embodiment of the support frame 140 encloses much of the mass storage device 150 to reduce EMI (electromagnetic interference) between the mass storage device 150 and the remainder of the computer system 5, such as neighboring Compact PCI cards. Spring fingers on the support frame 140 help to ground the mass storage device 150 to the computer chassis 110 and further improve the EMI seal around the mass storage device 150 from the remainder of the computer system 5. The cover 160 also helps to conceal EMI emissions.

Assembly of the computer system 5 is flexible. During assembly, the mass storage device 150 may be placed along with the support frame 140 into the computer chassis 110. Alternatively, the support frame 140 and the mass storage device 150 can be placed later into into the computer chassis 110. The mass storage device 150 blind-mates, allowing the mass storage device 150 to be inserted into the computer chassis 110 without a direct view of the expansion card slot on the backplane 120. The backplane connector is positioned and designed so that slight tolerance mismatches will not prevent the mass storage device 150 from mating with an expansion card slot on the backplane 120.

One embodiment allows for easy removal of the mass storage device 150 from the support frame 140. If the mass storage device 150 should fail, then the mass storage device 150 can be removed and replaced, without removing the mass storage frame from 140 from the computer chassis 110, speeding up the repair or replacement process.

Figure 6:
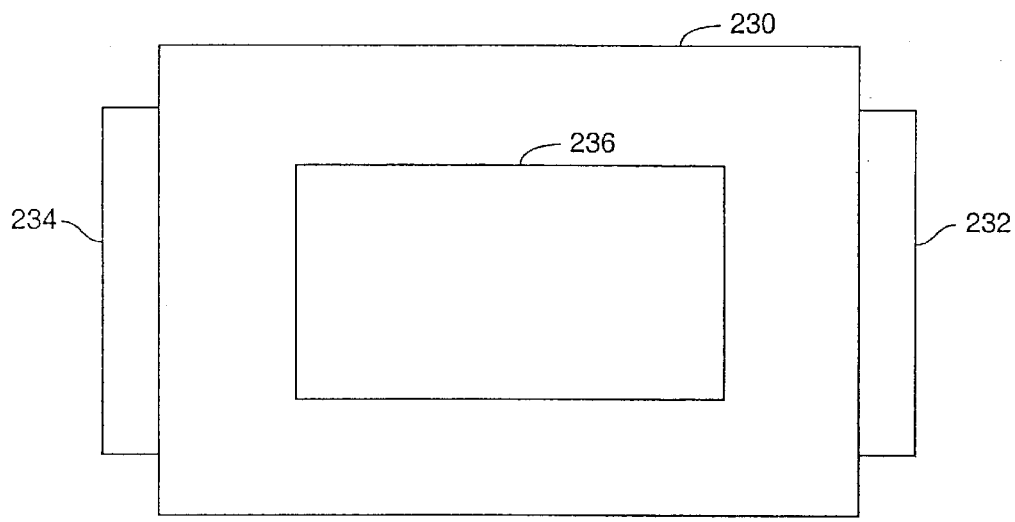
FIG. 6 is a diagram of an interface board.

FIG. 6 shows an embodiment of the interface board 230, which includes the mass storage connector 232 following a first signal and physical connector specification, and the backplane connector 234 following a second signal and physical connector specification. Circuitry 236 connect the mass storage connector 232 and the backplane connector 234. The mass storage connector 232 and the backplane connector 234 may share the same physical connector specification, the same signal specification, both the same physical connector and signal specification, or neither the same physical connector specification nor the same signal specification.

Figure 7:
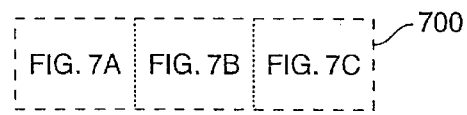
FIG. 7, FIG. 7A, FIG. 7B, FIG. 7C, FIG. 8, FIG. 8A, FIG. 8B, FIG. 8C, FIG. 9, FIG. 9A, and FIG. 9B are schematic diagrams of the interface board shown in FIG. 6.
Figure 7A:
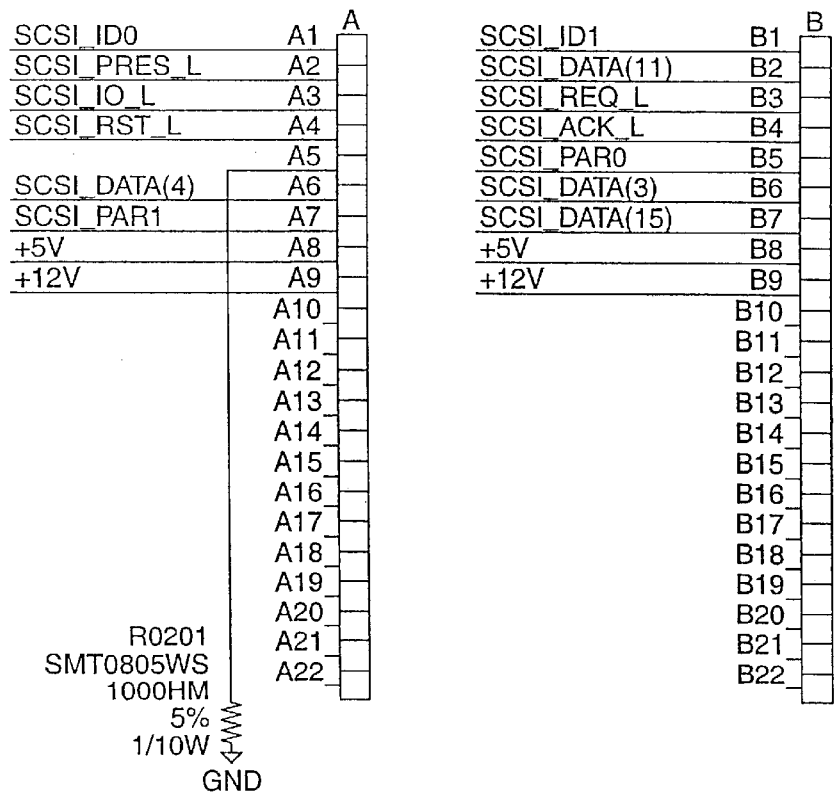
Figure 7B:
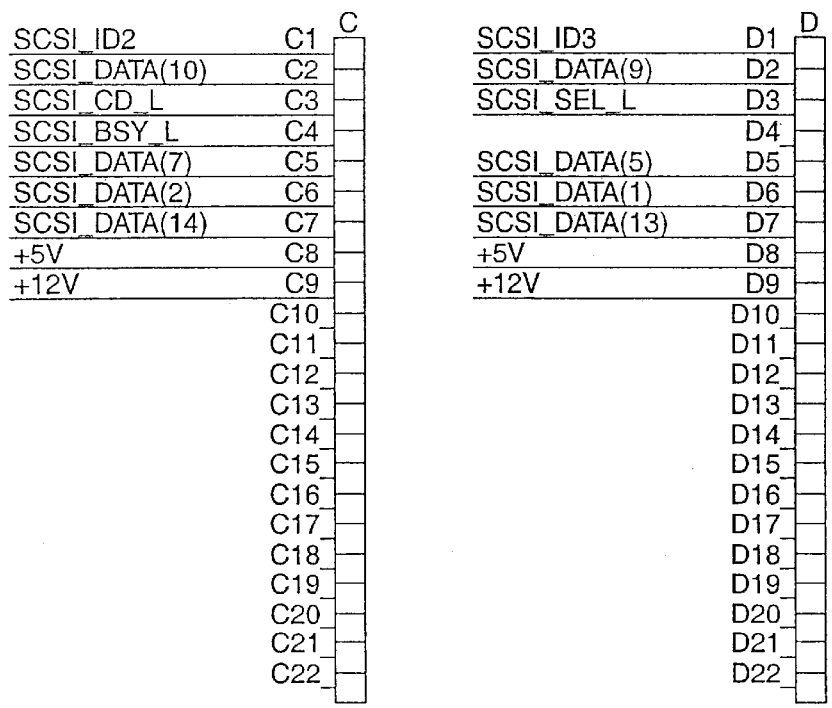
Figure 7C:
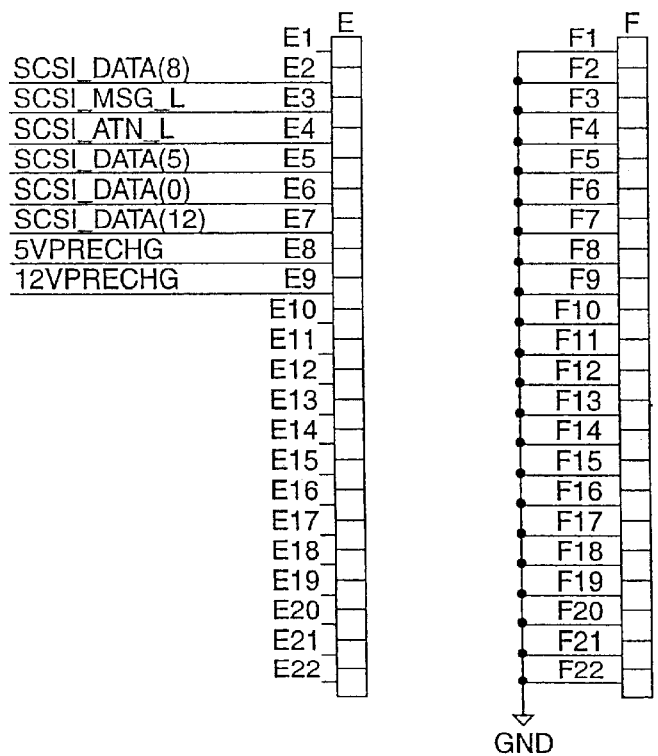
Figure 8:
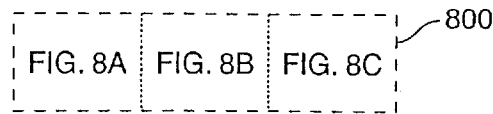
Figure 8A:
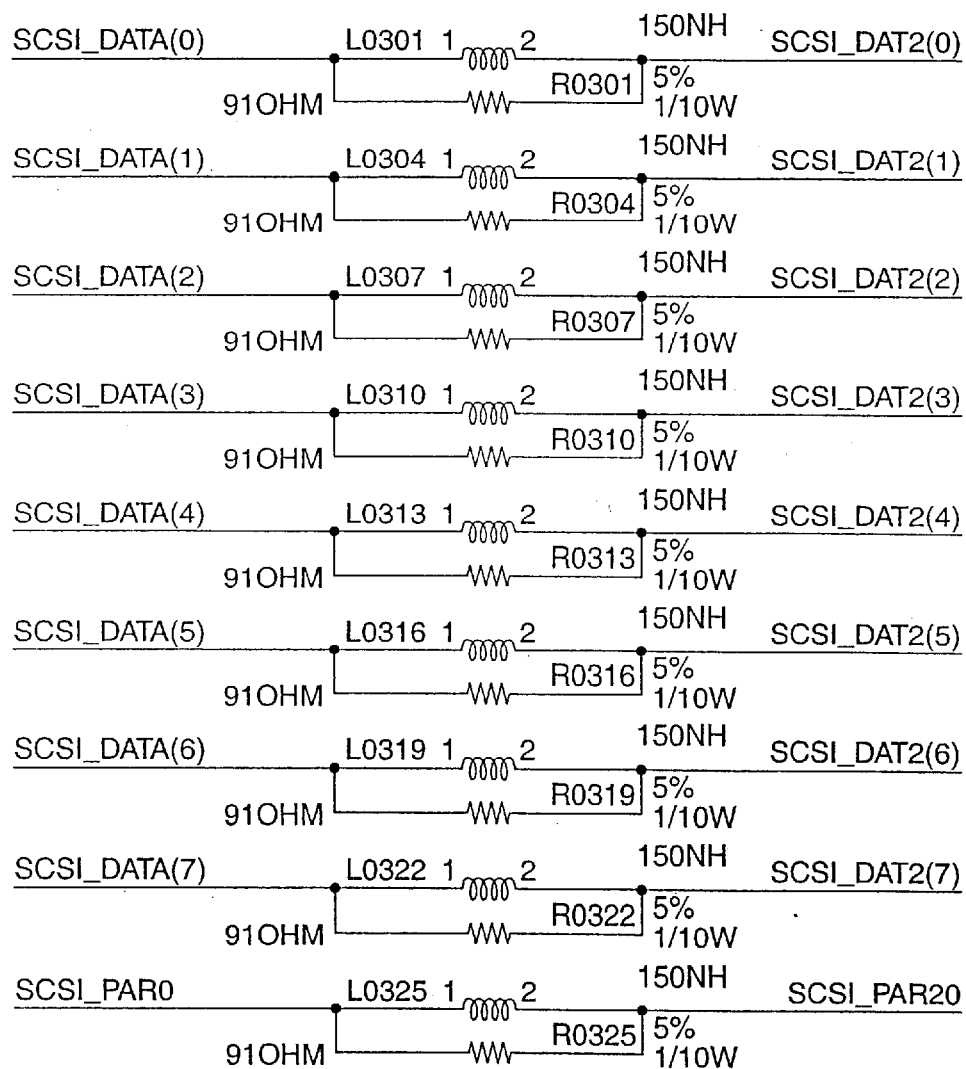
Figure 8B:
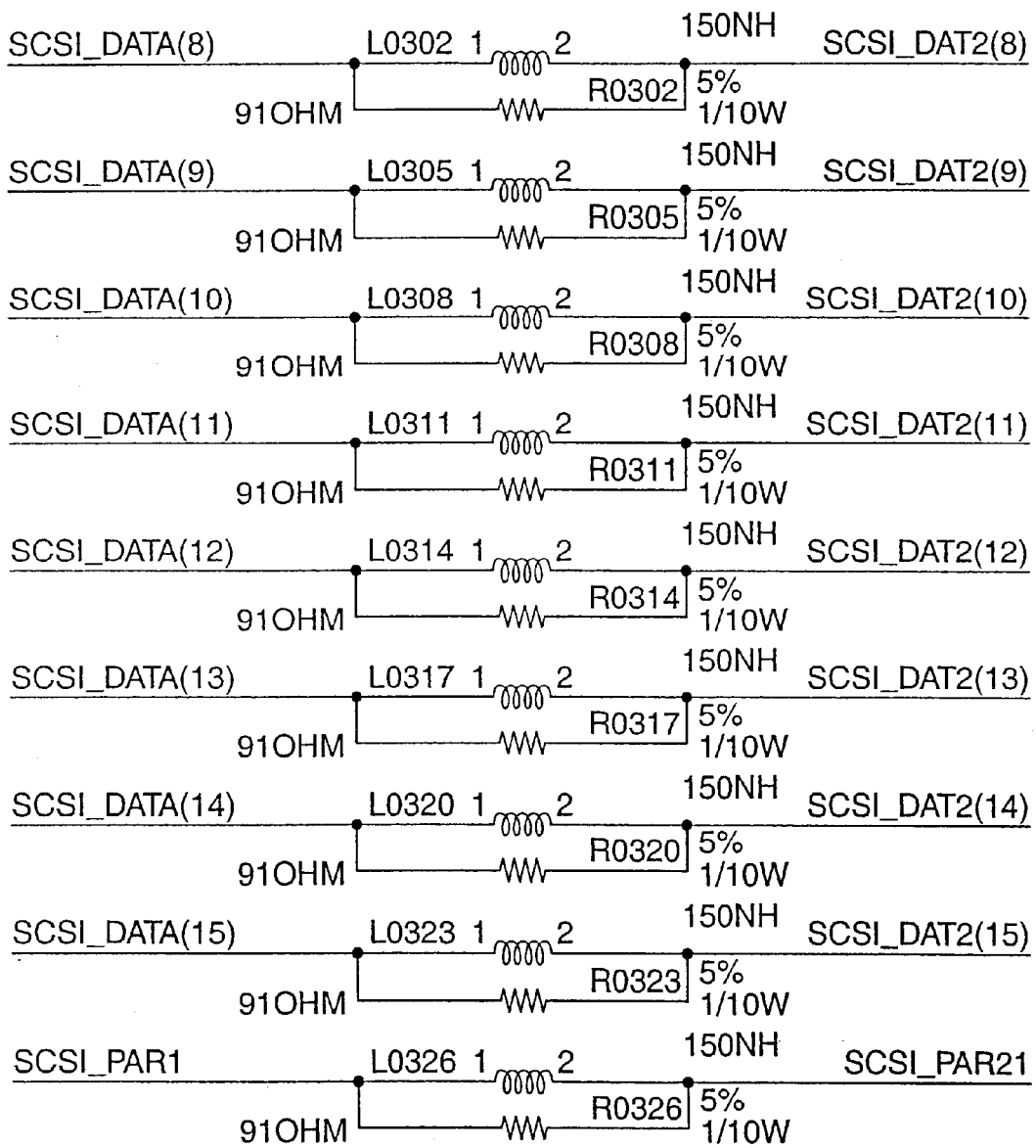
Figure 8C:
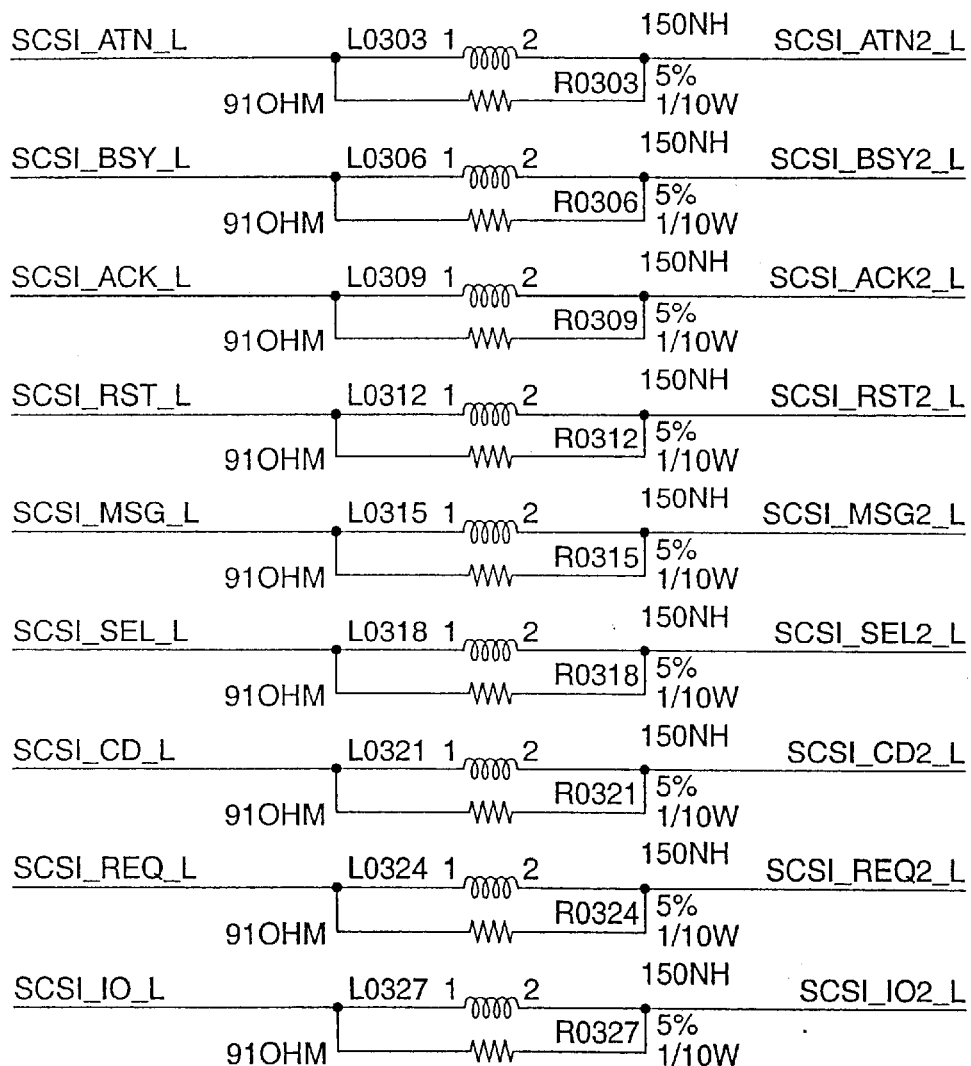
Figure 9A:
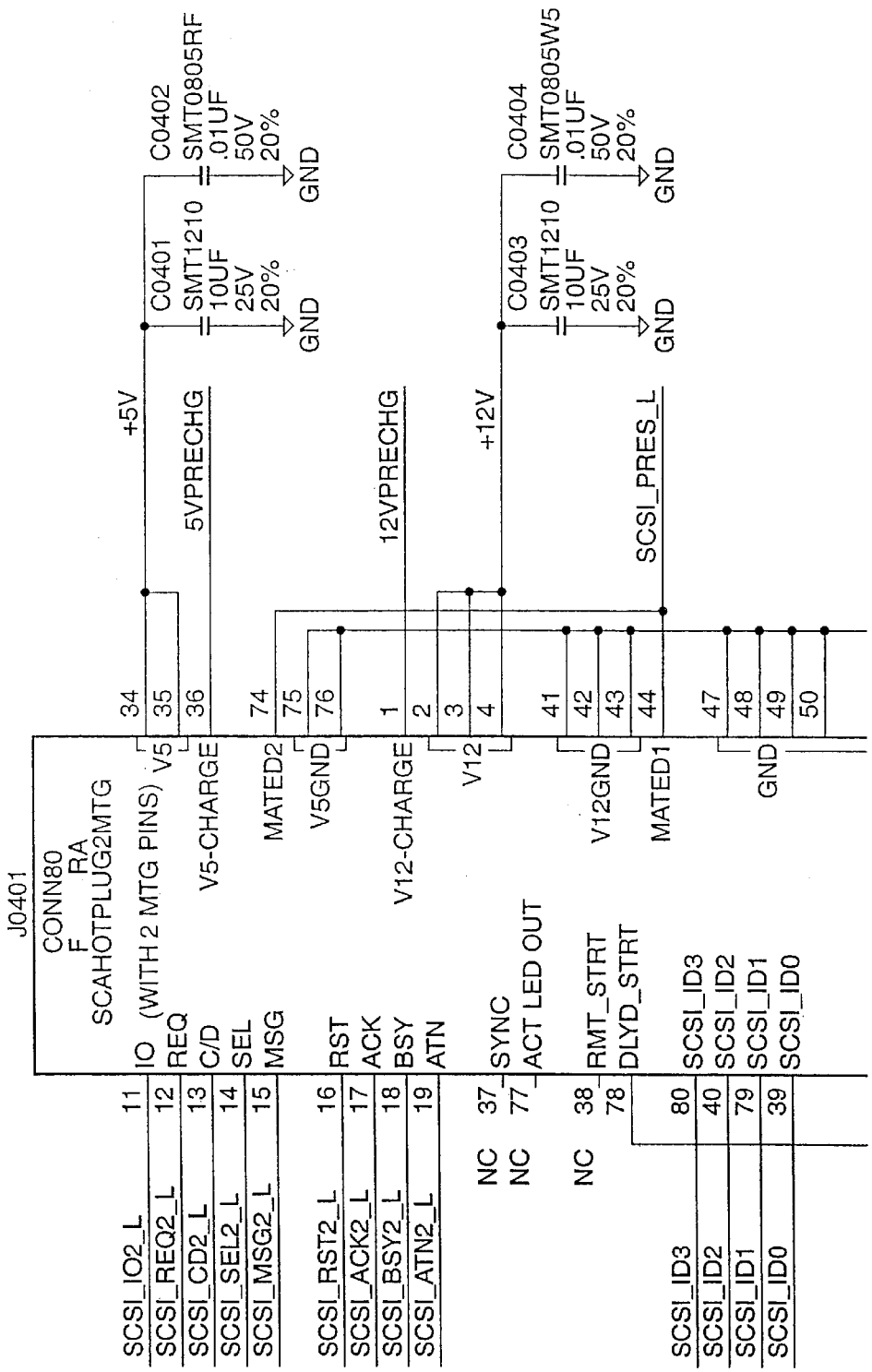
Figure 9B:
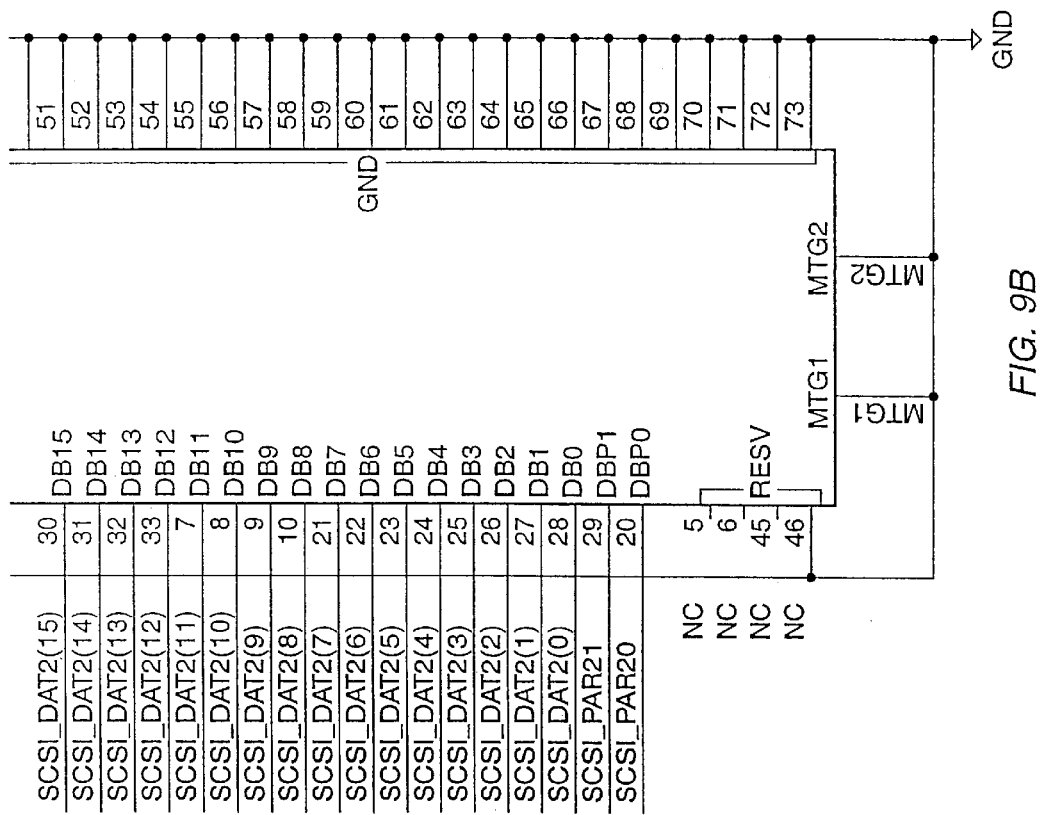
Figure 9:
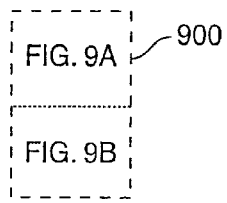

FIG. 7, FIG. 8, and FIG. 9 show one example of electrical schematic diagrams of the interface board 230 shown in FIG. 6. In this embodiment, both the physical connector and the signal specification are modified between the first connector and the second connector. FIG. 7, FIG. 7A, FIG. 7B, and FIG. 7C show the mapping 700 of SCSI (Small Computer Systems Interface) signals onto the pins of the backplane connector 234. FIG. 8, FIG. 8A, FIG. 8B, and FIG. 8C show circuitry 800 bridging SCSI signals between the backplane connector 234 and the mass storage connector 232. Resistors are positioned on one side of the interface board 230 and inductors on the other side of the interface board 230. FIG. 9, FIG. 9A, and FIG. 9B show the mapping 900 of the SCSI signals as the interface board 230 mates with the mass storage device 150. The figures are exemplary. Other signal specifications and signal-to-connector pin mappings may be followed.

Figure 10A:
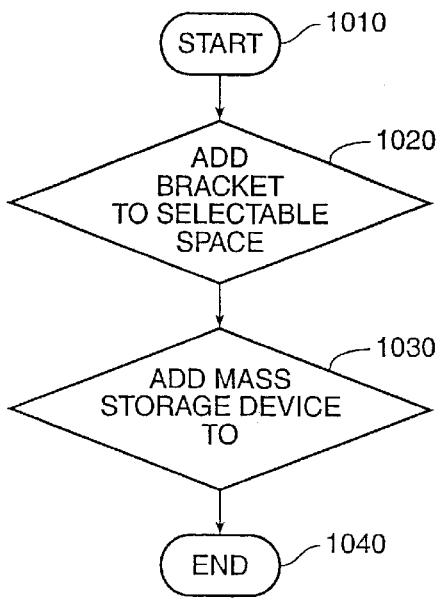
FIG. 10A and FIG. 10B are diagram of flow diagrams of methods involving a selectable space.
Figure 10B:
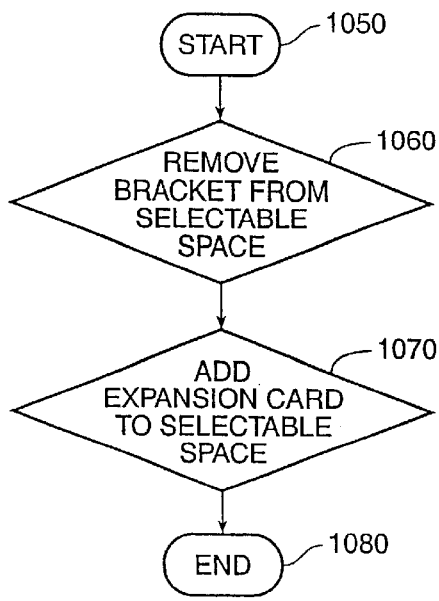

FIG. 10A and FIG. 10B show flow diagrams of various methods. In FIG. 10A, after a start 1010, in 1020 a frame is added to a selectable space. The selectable space can selectably accommodate one of a mass storage device and an expansion card. The addition of the frame to the selectable space in 1020 adapts the selectable space to allow the the selectable space to support the mass storage device. The adapting can include coupling an adapter to a backplane connector. In 1030, the mass storage device is added to at least part of the selectable space, and the mass storage device is physically supported in the selectable space, followed by an end 1040. Optionally, the mass storage is adapted to allow communication between the mass storage device and a backplane connector.

In FIG. 10B, after a start 1050, in 1060 a frame is removed from a selectable space. The frame allowed a mass storage device requiring frame support to occupy the selectable space. The selectable space previously occupied by the selectable space is freed. In 1070, an expansion card is added to the selectable space vacated by the frame, so that at least part of the selectable space is occupied by the expansion card, followed by an end 1080.

While the preferred embodiments of the present invention have been illustrated herein in detail, it should be apparent that modifications and adaptations to those embodiments may occur to those skilled in the art without departing from the scope of the present invention as set forth in the following claims.

What is claimed is:

1. A mass storage apparatus, comprising:

a support frame removably installable in an expansion card space of a computer system chassis; and an interface board coupled to the support frame, the interface board comprising:

a mass storage device connector;
a backplane connector; and
circuitry for electrically connecting the mass storage device connector and the backplane connector;

wherein the mass storage apparatus supports blind-mating of a mass storage device to the computer system, within the expansion card space, via the interface board.

2. The mass storage apparatus of claim 1, wherein the backplane connector is a Compact PCI connector.

3. The mass storage apparatus of claim 1, wherein the mass storage device connector is an SCA-2 connector.

4. The mass storage apparatus of claim 1, further comprising:

the mass storage device, wherein the mass storage device is supported by the support frame while connected to the interface board.

5. The mass storage apparatus of claim 1, wherein installation of said support frame within the expansion card space prevents installation of a first expansion card within the expansion card space.

6. The mass storage apparatus of claim 1, wherein installation of said support frame within the expansion card space leaves room for installation of a first expansion card within the expansion card space.

7. An interface board for coupling a mass storage device to an expansion slot of a computer system, comprising:
  a device connector compliant with a first specification for coupling a mass storage device to a computer system;
  a computer system connector compliant with a second specification for coupling a mass storage device to a computer system; and
  circuitry coupled to the device connector and the computer system connector;
  wherein one or more of the device connector and the computer system connector are configured for blind-mating.

8. The interface board of claim 7, wherein the first specification includes SCA-2, and the second specification includes Compact PCI.

9. The interface board of claim 7, wherein the first specification and the second specification are identical.

10. The interface board of claim 9, wherein the first specification and the second specification include Compact PCI.

* * * * *

UNITED STATES PATENT AND TRADEMARK OFFICE
CERTIFICATE OF CORRECTION

PATENT NO. : 6,614,652 B2  Page 1 of 1
DATED : September 2, 2003
INVENTOR(S) : White et al.

It is certified that error appears in the above-identified patent and that said Letters Patent is hereby corrected as shown below:

<u>Title page,</u>
Item [56], References Cited, U.S. PATENT DOCUMENTS, insert:
-- 6,442,021 B1 *   8/27/2002   Bolognia et al.   361/685 --.

Signed and Sealed this

Eleventh Day of April, 2006

JON W. DUDAS
*Director of the United States Patent and Trademark Office*